US008700329B2

(12) United States Patent
Miyazaki et al.

(10) Patent No.: US 8,700,329 B2
(45) Date of Patent: Apr. 15, 2014

(54) NAVIGATION APPARATUS

(75) Inventors: Hideto Miyazaki, Tokyo (JP); Tsuyoshi Sempuku, Tokyo (JP); Shoji Tanaka, Tokyo (JP); Kuniyo Ieda, Tokyo (JP); Takashi Sadahiro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 78 days.

(21) Appl. No.: 13/266,035

(22) PCT Filed: Dec. 8, 2009

(86) PCT No.: PCT/JP2009/006690
§ 371 (c)(1),
(2), (4) Date: Jan. 13, 2012

(87) PCT Pub. No.: WO2010/137091
PCT Pub. Date: Dec. 2, 2010

(65) Prior Publication Data
US 2012/0109516 A1    May 3, 2012

(30) Foreign Application Priority Data

May 29, 2009    (JP) ................................ 2009-130502

(51) Int. Cl.
*G01C 21/34*    (2006.01)
(52) U.S. Cl.
USPC ........... 701/533; 701/430; 701/432; 701/455; 701/408
(58) Field of Classification Search
USPC .......................... 701/430, 432, 455, 408, 533
See application file for complete search history.

(56) References Cited

U.S. PATENT DOCUMENTS 5,493,294 A * 2/1996 Morita .......................... 340/988
5,764,139 A    6/1998 Nojima et al.
5,832,406 A * 11/1998 Iwami et al. .................. 701/428
(Continued)

FOREIGN PATENT DOCUMENTS

CN        200979593 Y    11/2007
DE     2004-061648 A     2/2004
(Continued)

OTHER PUBLICATIONS

JP2008-185522 English-Machine language translation, retrieved on Aug. 7, 2013.*
(Continued)

*Primary Examiner* — Calvin Cheung
(74) *Attorney, Agent, or Firm* — Birch, Stewart, Kolasch & Birch, LLP.

(57) ABSTRACT

A navigation apparatus is provided that is highly convenient for a user to view a map screen and a menu window. A display controller 15 determines a view mode of each of a map screen and a menu window, based on information about a travel condition of a moving object from a route search unit 12 and an own-vehicle location identification unit, when the menu window is displayed according to information entered from an input unit 10. A display map generator 16 generates a map screen according to information about the view mode from the display controller 15. A display menu generator 17 generates a menu window according to information about the view mode from the display controller 15. A display unit 21 displays the map screen from the display map generator 16 and the menu window from the menu generator 17.

6 Claims, 8 Drawing Sheets

(56) References Cited

U.S. PATENT DOCUMENTS

| | | | |
|---|---|---|---|
| 6,321,158 B1* | 11/2001 | DeLorme et al. | 701/426 |
| 6,873,907 B1* | 3/2005 | Millington et al. | 701/410 |
| 7,176,813 B2* | 2/2007 | Kawamata et al. | 340/995.13 |
| 7,472,020 B2* | 12/2008 | Brulle-Drews | 701/428 |
| 8,285,481 B2* | 10/2012 | De Silva et al. | 701/409 |
| 2003/0001865 A1* | 1/2003 | Hirose et al. | 345/619 |
| 2005/0071077 A1* | 3/2005 | Kadono et al. | 701/201 |
| 2005/0102102 A1* | 5/2005 | Linn | 701/210 |
| 2007/0067086 A1 | 3/2007 | Rothschild | |
| 2008/0082262 A1* | 4/2008 | Silva et al. | 701/211 |
| 2008/0307356 A1* | 12/2008 | Kawauchi | 715/810 |

FOREIGN PATENT DOCUMENTS

| | | | |
|---|---|---|---|
| JP | 9-123848 A | 5/1997 | |
| JP | 10-275542 A | 10/1998 | |
| JP | 11-51686 A | 2/1999 | |
| JP | 2003-214883 A | 7/2003 | |
| JP | 2006-72132 A | 3/2006 | |
| JP | 2006-300955 A | 11/2006 | |
| JP | 2008-40598 A | 2/2008 | |
| JP | 2008089483 * | 4/2008 | G01C 21/00 |
| JP | 2008185522 * | 8/2008 | G01C 21/00 |

OTHER PUBLICATIONS

JP2008-040596 (from IDS filed on Oct. 24, 2011) English-Machine language translation, retrieved on Aug. 7, 2013.*

JP2008-089483 English-Machine language translation, retrieved on Aug. 7, 2013.*

* cited by examiner

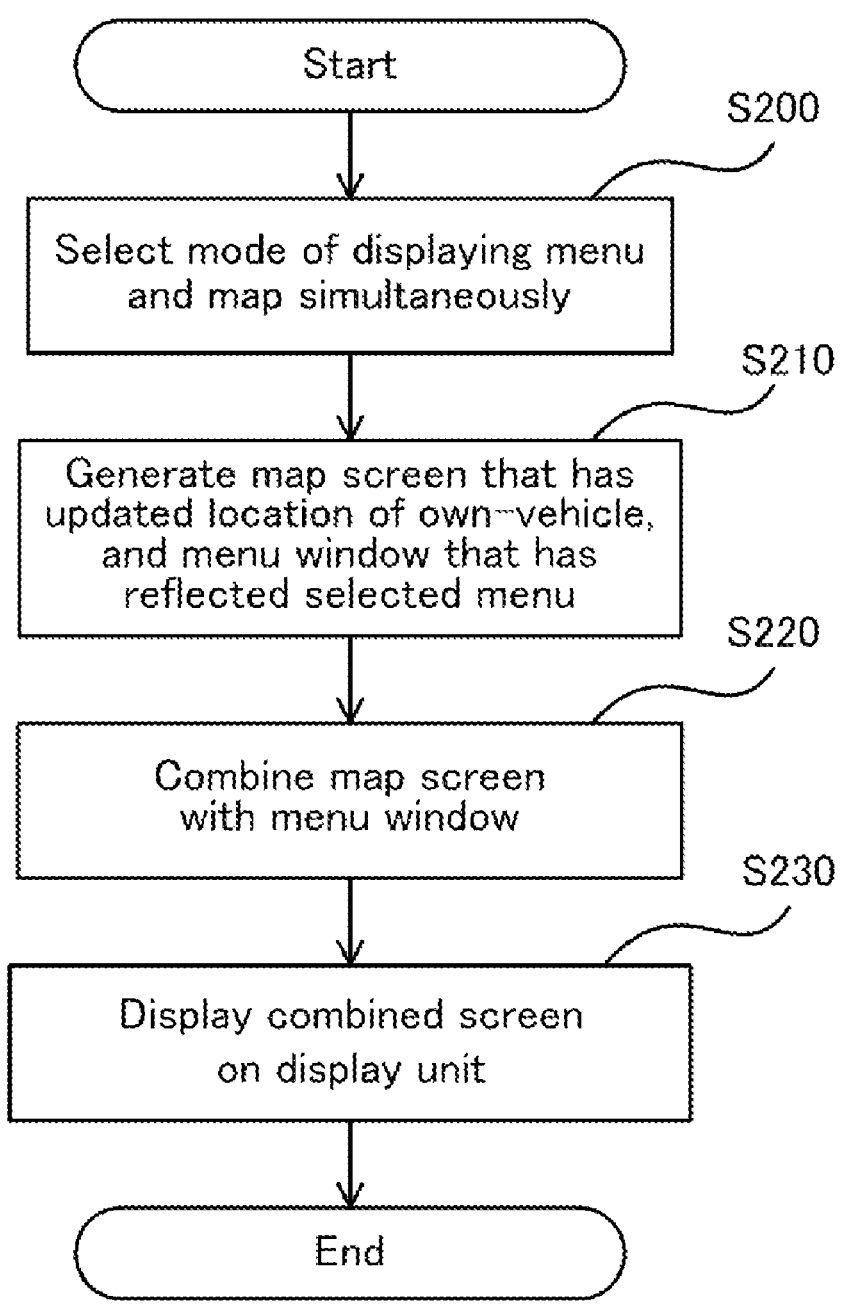

NAVIGATION APPARATUS

TECHNICAL FIELD

The present invention relates to a navigation apparatus, mounted on a moving object such as a vehicle, that provides map display and guidance to a driver from an origin to a destination.

BACKGROUND ART

In a conventional map display apparatus, when, during route guidance, an area where a guided route is displayed on a map screen overlaps that where an information/menu window is displayed, the window is displayed so that the guided route may not be hidden from sight on the screen. This prevents a user from having difficulties because of the guided route being invisible (refer to, for instance, Patent Document 1).

RELATED ART REFERENCE

Patent Document

[Patent Document 1]
Japanese Unexamined Patent Application Publication No. 2006-300955 (pages 7 and 8, and FIG. 6)

DISCLOSURE OF INVENTION

Problem that the Invention is to Solve

A problem with respect to a conventional map display apparatus and a program therefor is that although an information/menu window is displayed so as not to hide a guided route on the screen, the information/menu window is not varied according to vehicle travel conditions, thereby lacking the convenience for a user.

The present invention is directed to overcome the above problem, and an object of the invention is to provide a navigation apparatus that is highly convenient for a user to view a map screen and a menu window.

Means for Solving the Problem

A navigation apparatus according to the present invention comprises an own-vehicle position identification unit that identifies a travel speed of a moving object and a current location thereof, an input unit that receives a user input instruction, a map database that stores map data, a route search unit that searches for a route from an origin to a destination, a display controller, a display map generator, a display menu generator, and a display unit. When the menu window is displayed using information entered from the input unit, the display controller uses information about travel conditions of the moving object from the route search unit and the own-vehicle position identification unit, to determine a view mode of a map screen and a menu window. The display map generator generates the map screen according to information about the view mode from the display controller. The display menu generator generates the menu window according to information about the view mode from the display controller. The display unit displays the map screen from the display map generator and the menu window from the display menu generator.

Advantageous Effects of the Invention

According to this invention, a highly convenient navigation apparatus is provided since a map screen and a menu window are displayed in accordance with travel conditions of a moving object.

BRIEF DESCRIPTION OF DRAWINGS

FIG. 3 is another flow diagram illustrating operations according to Embodiment 1 through Embodiment 3 of the present invention;

BEST MODE FOR CARRYING OUT THE INVENTION

Embodiment 1

Figure 1:
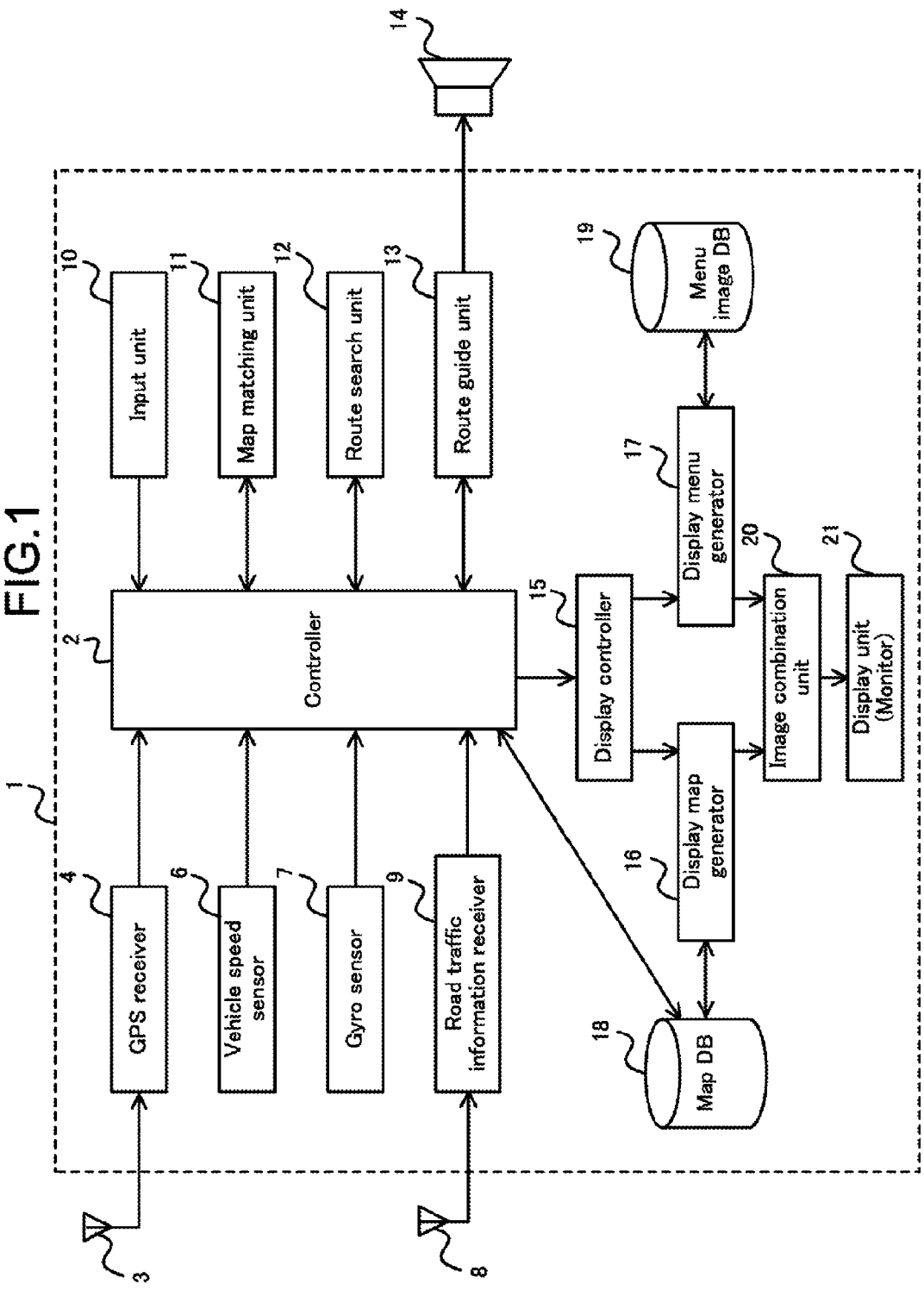
FIG. 1 is a block diagram illustrating a navigation apparatus according to Embodiment 1 through Embodiment 3 of the present invention.

FIG. 1 is a block diagram illustrating a navigation apparatus for use in a moving object such as a vehicle, according to Embodiment 1 of the present invention. A controller 2 within a navigation apparatus 1 is configured with, for instance, a microcomputer and a memory device, to control all the operations of the apparatus. A map match unit 11, a route search unit 12, a route guide unit 13, a display controller 15, a display map generator 16, and a display menu generator 17, which will be described later, are implemented by application programs that run under the control of the microcomputer.

A GPS receiver 4 receives GPS signals from GPS satellites through an antenna for use in receiving the GPS signals, designated by numeral 3, whereby a vehicle's current location is detected. A vehicle speed sensor 6 detects a travel speed of the moving object, with a gyro sensor 7 detecting a direction where the moving object is traveling. A road traffic information receiver 9 receives road traffic information, such as traffic congestion or traffic restrictions, through FM broadcast radio waves, radio beacons, optical beacons or the like, by way of an antenna for use in receiving the road traffic information, designated by numeral 8.

An input unit 10 receives a user input instruction, via an operation panel, a remote control unit or the like, not shown. The map match unit 11 identifies a current location of the moving object by matching a current location—generated based on current location data from the GPS receiver 4, speed data transmitted from the vehicle speed sensor 6, and orientation data transmitted from the gyro sensor 7—to a map represented by map data retrieved from a map data base (DB) 18. These devices—the GPS receiver 4, the vehicle speed sensor 6, the gyro sensor 7, and the map match unit 11—constitute an own-vehicle location identification unit.

The route search unit 12 searches for, using the map data from the map DB 18, a route from an origin, a setting point or a current location of the moving object to a destination thereof, or to the destination by way of a stopover point—entered by a user with the input unit 10. The route guide unit 13 creates a route guide map and route guide messages to be output when the moving object travels along a route determined using the route search unit 12. A loudspeaker 14 audibly emits the route guide messages delivered from the road guide unit 13.

The display controller 15 determines and controls a view mode of each of a map screen generated by the display map generator 16 and a menu window by the display menu generator 17. The display map generator 16 generates a map screen by using data of the map DB 18 containing map data and facility data, according to the information about the view mode from the display controller 15. The display menu generator 17 generates a menu window by using data contained in a menu display image DB 19 that stores image data for displaying the menu, according to the information about the view mode from the display controller 15. These DBs are contained in a device, such as a hard disk drive (HDD) or a high capacity memory.

An image combination unit 20 combines a map screen, generated from the display map generator 16, with a menu window from the display menu generator 17, to display the combined screen on a display unit 21, such as a monitor constituted with a device such as a liquid crystal display (LCD).

In addition, the navigation apparatus 1 uses the antenna 3, the antenna 8 and the loudspeaker 14 that are built-in to the moving object, but may incorporate such devices therein.

Figure 2:
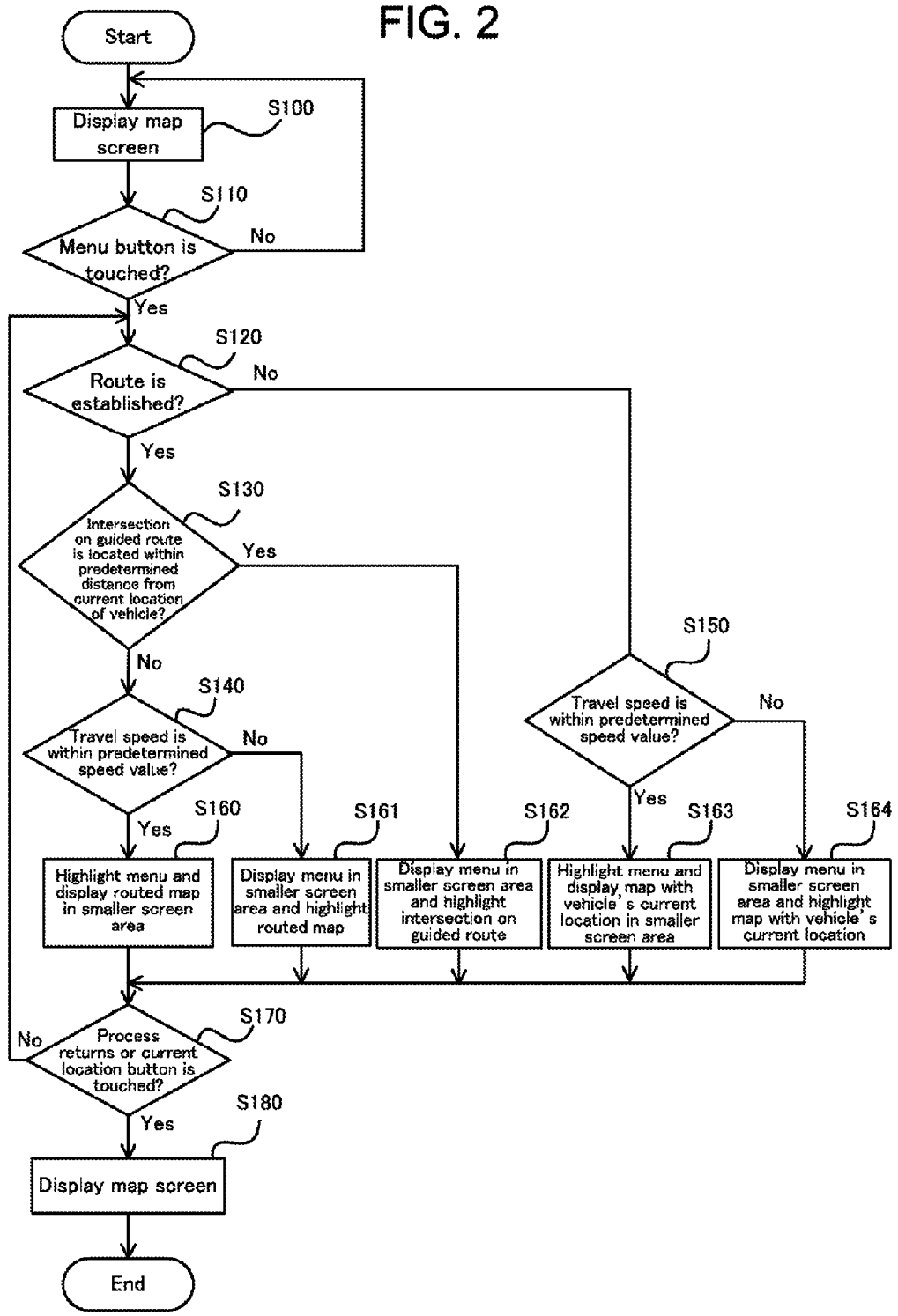
FIG. 2 is a flow diagram illustrating operations according to Embodiment 1 through Embodiment 3 of the present invention.

Operation of the navigation apparatus thus configured will be described with reference to flow diagrams in FIGS. 2 and 3. FIG. 4 shows an example of the screen display where the route has been established, and FIG. 5, an example where no route has been established. When activating the navigation apparatus 1, a map screen is displayed which includes an own-vehicle mark representing a location of the moving object on which the apparatus 1 is mounted, as shown in FIG. 4(*a*) and FIG. 5(*a*) (FIG. 2, step S100). In the above figures, a wedge-shaped mark in the lower middle of the screen represents an own-vehicle, and whose top end indicates a current location of the vehicle.

Next, it is determined whether the menu button has been touched in order to access the menu window (step S110). If it remains untouched, an update to the current location and step S100 are repeated. When it has been touched, it is determined whether the route has been established (step S120). When no route has been established, the process proceeds to step S150. When the route has been established, it is determined whether a distance between an own-vehicle's current location and an intersection on the guided route is within a predetermined range, in other words, whether the own-vehicle is located near the intersection (step S130). When the own-vehicle is far away from the intersection, it is determined whether the own-vehicle travels at a speed less than a predetermined value (step S140).

When the own-vehicle is traveling at a slow speed, in particular while the vehicle is stopped, the user can select a menu more easily; thus, as shown in FIG. 4(*b*), a menu and map view mode is selected such that the menu is highlighted and a routed map is displayed in a smaller screen area to the extent that the user can recognize the appearance of the map (step S160). This time menu is a regular one, with all menu items being selectable. Further, this time map may be a map that is scaled to include the intersection on the guided route, a map where facilities, names, and the like are removed therefrom, a map whose image is simplified by removing narrow streets and leaving only main streets, and/or a map whose image is dimly displayed by reducing its contrast.

On the other hand, when the vehicle travels at a speed more than the predetermined value at step S 140, the vehicle is easier to drive as the map is easier to view; thus, as shown in FIG. 4(*c*), a menu and map view mode is selected such that the menu is displayed in a smaller screen area to the extent that the user can recognize the appearance of the menu, and the routed map is highlighted (step S161). This time menu is displayed in a smaller screen area when compared to that in FIG. 4(*b*). Further, particular menu items may be displayed in a color such as gray, to limit user selection of the items, and/or only marks may be shown with their characters and letters removed. It is preferable if this time map is displayed in a larger screen area, or shows a wider area, in comparison to that in FIG. 4(*b*).

Here, when the vehicle is located near the intersection on guided the route at step S 130, a menu and map view mode is selected as shown in FIGS. 4(*c*) and 4(*e*), such that the menu is displayed in a smaller screen area to the extent that the user can recognize the appearance of the menu and the map at the intersection on the guided route is highlighted (step S162). Highlighting the direction of a turn at the intersection calls the driver's attention to make a turn. It is preferable if in this time map, the representation size of the intersection is increased, and/or the intersection is boldly displayed by increasing its contrast and/or made to blink or do a similar action, so that the user realizes its appearance easily. This time menu is displayed in a smaller screen area, and the menu items may be displayed in a color such as gray, to limit user's selection of the items and only menu items may be left by removing characters and letters. At step S162, the number of selectable menu items may be limited depending on whether the own-vehicle travels at a speed less than the predetermined value, in particular whether the vehicle is stopped. In other words, while the vehicle is stopped, some menu items may be selectable (FIG. 4(*d*)), but while the vehicle is moving, all the menu items may be displayed in a color such as gray (FIG. 4(*e*)), to disable selection of the menu items.

Figure 5A:
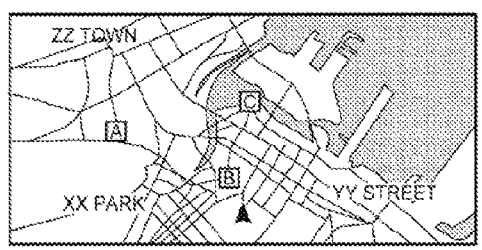
FIG. 5 is a set of drawings showing different examples of the screen display according to Embodiment 1 of the present invention.

When no route is established at step S120, it is determined whether the own-vehicle travels at a speed less than the predetermined value (step S150). When the own-vehicle is traveling at a slow speed, in particular while the vehicle is stopped, the user can select a menu more easily; thus, a menu and map view mode is selected as shown in FIG. 5(*b*), such that the menu is highlighted and a map with a vehicle's current location is displayed in a smaller screen area to the extent that the user can recognize the appearance of the map (step S163). This time menu is a regular one, with all menu items being selectable. This time map may be a map that is scaled to include the surroundings of the own-vehicle's current location, a map where facilities, names, and the like are removed therefrom, a map whose image is simplified by removing narrow streets and leaving only main streets, and/or a map whose image is dimly displayed by reducing its contrast.

Figure 5B:
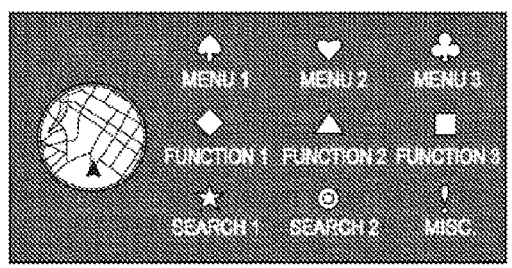
Figure 5C:
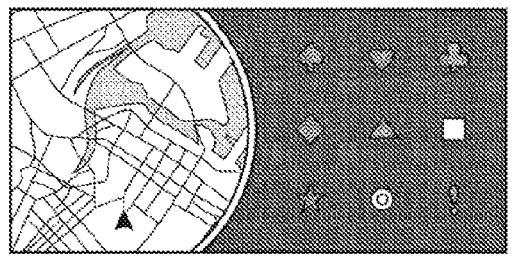

On the other hand, when the vehicle travels at a speed more than the predetermined value at step S150, an easy-to-read map makes it easier to drive the vehicle; thus, as shown in FIG. 5(*c*), a menu and map view mode is selected such that menu is displayed in a smaller screen area to the extent that the user can recognize its appearance, and the map with the vehicle's current location is highlighted (step S164). This time menu is displayed in a smaller screen area when compared to that in FIG. 5(b). Particular menu items may be displayed in a color such as gray, to limit user's selection of the items and/or only menu items may be left by removing characters and letters. It is preferable if this time map is displayed in a larger screen area, and/or shows a wider area, in comparison to that in FIG. 5(b).

In a method of displaying the menu and the map simultaneously, the display controller 15 first determines a view mode, as shown in the flow diagram of FIG. 3 (step S200). The view mode is one of the above five different view modes of steps S160 through S164. Next, as the own-vehicle varies its location, the display map generator 16 generates a map screen where the own-vehicle's location has been updated, and also the display menu generator 17 generates a menu window where a selected menu item has been reflected (step S210). Thereafter, the image combination unit 20 combines the map screen and the menu window together or lays one over another (step S220), and finally the combined image screen is displayed on the display unit 21 such as a monitor (step S230).

In this way, when the menu window and the map screen are displayed by combining them together and/or overlaying one onto another and if a button in the menu window is selected, the selected process is implemented as appropriate. After that, it is determined whether the process returns or a current location button has been touched (FIG. 2, step S170). If the button remains untouched, then the process returns to step S120, to keep displaying the menu and the map simultaneously. When it is touched, only the map screen is displayed without displaying the menu window and then the process ends (step S180).

The navigation apparatus, thus configured, varies the view mode of map and menu according to the travel conditions, based on the vehicle's travel speed, the presence or absence of established route, and the distance from the current location to the intersection on the guided route. While the vehicle is stopped, the map is displayed in a smaller screen area and the menu is highlighted, thereby facilitating selection of the menu. While the vehicle is moving, the menu is displayed in a smaller screen area and the map is highlighted with its screen area increased, so that the map is easy to visually perceive and the vehicle is thereby easy to drive. When the route has been established, the intersection on the guided route is highlighted, so that a driver is less likely to drive a wrong route and follows the guided route more easily. In this way, the view mode of the map screen and the menu window varies according to the travel conditions, so that there is provided a highly convenient navigation apparatus.

Embodiment 2

Embodiment 1 provides an example of displaying the map screen and the menu window in a separate window. In Embodiment 2, a navigation apparatus will be described which is easy to view and use because a map is displayed seamlessly on the screen by adjusting transparency of the menu window to thereby cause the map to be seen through the translucent menu window.

A configuration of the apparatus of the present embodiment is the same as that of the FIG. 1 block diagram; the corresponding flow diagrams are the same as those of FIGS. 2 and 3. Differences between Embodiment 2 and Embodiment 1 are depicted in examples of displayed screens of FIG. 6 where a route is established and of FIG. 7 where the route is not established. The differences will be described below.

Figure 6A:
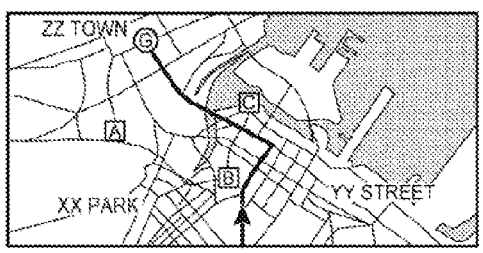
FIG. 6 is a set of drawings showing examples of a screen display according to Embodiment 2 of the present invention.
Figure 7A:
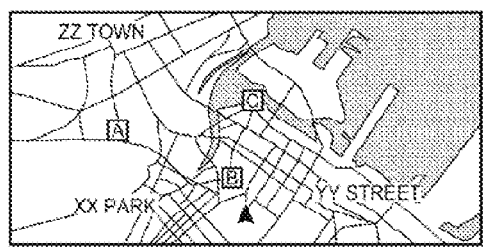
FIG. 7 is a set of drawings showing different examples of the screen display according to Embodiment 2 of the present invention.

When the navigation apparatus 1 is activated, the map screen is displayed (FIG. 2, step S100) that contains the own-vehicle mark indicating the current location of the moving object on which the apparatus 1 is mounted, as shown in FIGS. 6(a) and 7(a). After the menu button has been touched in order to access the menu window, the presence or absence of an established route, the distance between the vehicle and an intersection on the guided route, and a travel speed of the vehicle, are determined to thereby select one of the five different view modes corresponding to steps S160 through S164.

Figure 6B:
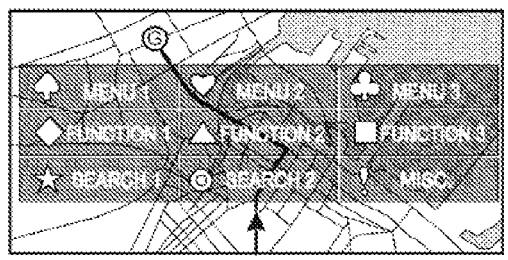

FIG. 6(b) corresponds to step S160. In Embodiment 2, the menu is highlighted and also the map behind the menu is made to be seen through the menu by adjusting transparency of the menu to the extent that the user can recognize the appearance of the map. This time menu, which is translucent, is a regular one and every menu item is selectable. This time map is the same as that of FIG. 6(a), but may be such as a map where facilities, names, and the like are removed therefrom, as a map that is simplified by removing narrow streets and leaving only main streets and/or as a map that is dimly displayed by reducing its contrast.

Figure 6C:
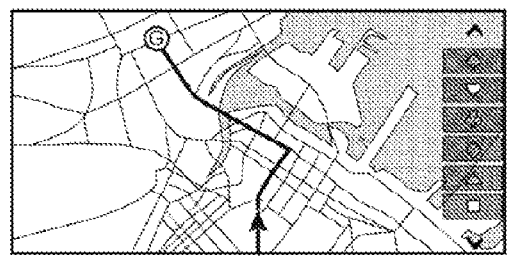

FIG. 6(c) corresponds to step S161. While the map behind the menu is left as it is, the menu is displayed in a smaller screen area to the extent that the user can recognize the appearance of the menu, and the menu items are made to be scrolled on the screen and also the map behind the menu is made to be seen through the menu by adjusting transparency of the menu. Particular items of this time menu may be displayed in a color such as gray, to prevent the user from selecting the item and/or only menu items may be left by removing characters and letters. This time map is the same as that of FIG. 6(b), but the contrast of the map may be slightly increased to facilitate its visibility.

Figure 6D:
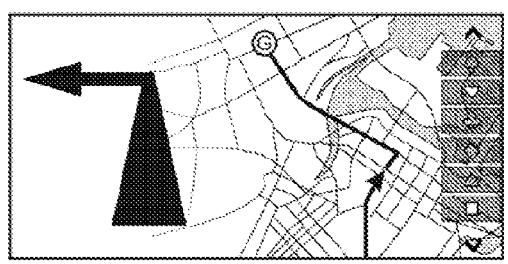
Figure 6E:
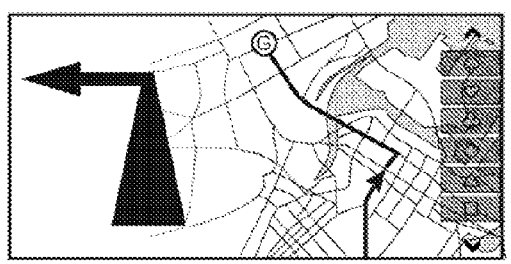

FIGS. 6(d) and 6(e) correspond to step S162. This time menu is displayed in a smaller screen area to the extent that the user can recognize the appearance of the menu and the menu items are made to be scrolled, and also the map behind the menu is made to be seen through the menu by adjusting transparency of the menu. The menu items may be displayed in a color such as gray, to limit user's selection of the items, and/or only marks may be shown with their characters and letters removed. Further, the map behind the menu is progressively dimmed, and on the dimmed map a graphical symbol is provided additionally and seamlessly that highlights making a turn at an intersection by increasing the representation size of the intersection. It is preferable if the contrast of the graphical symbol is increased and the symbol is boldly displayed and/or made to blink or do a similar action, so that the user realizes its appearance easily. As with Embodiment 1, the number of selectable menu items may be limited depending on whether the own-vehicle travels at a speed less than the predetermined value, in particular whether it is stopped. In other words, while the vehicle is stopped, some menu items may be selectable (FIG. 6(d)), but while it is moving, all the menu items may be displayed in gray or the like (FIG. 6(e)), to disable selection of the menu items.

Figure 7B:
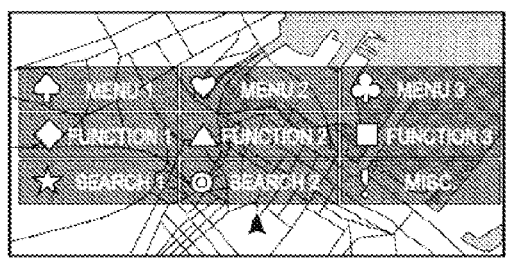

FIG. 7(b) corresponds to step S163, whose difference from FIG. 6(b) is that only a route has not been established. The menu is highlighted and also the map behind the menu is made to be seen through the menu by adjusting the transparency of the menu to the extent that the user can recognize the appearance of the map. This time menu, which is translucent, is a regular one and every menu item can be selected. This time map is the same as that of FIG. 7(a) and may be such as a map where facilities, names, and the like are removed therefrom, as a map that is simplified by removing narrow streets and leaving only main streets, and/or as a map that is dimly displayed by reducing its contrast.

Figure 7C:
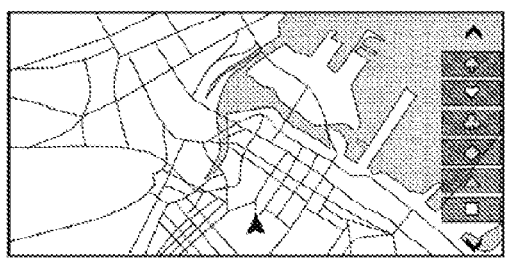

FIG. 7(c) corresponds to step S164, whose difference from FIG. 6(c) is that only a route has not been established. While the map behind the menu is left as it is, the menu is displayed in a smaller screen area to the extent that the user can recognize the appearance of the menu, and the menu items are made to be scrolled on the screen and also the map behind the menu is made to be seen through the menu by adjusting transparency of the menu. This time menu may be such that particular menu items are displayed in a color such as gray, to limit user's selection of the items and/or only menu items may be left by removing characters and letters. This time map is the same as that of FIG. 7(b), but the contrast of the map may be slightly increased to facilitate its visibility.

When the navigation apparatus, thus configured, varies the view mode of map and menu according to the travel conditions, based on the vehicle's travel speed, the presence or absence of established route, and the distance from the current vehicle's location to the intersection on the guided route, then a map is displayed seamlessly on the screen by adjusting size and transparency of the menu window; thus, the map is easy to view and operability of the menu is improved. In addition, since the intersection on the guided route is highlighted, the navigation apparatus is provided that is highly convenient.

Embodiment 3

In Embodiment 1 and Embodiment 2, a regular map is displayed on a screen at the time when a route is established and the vehicle is stopped, while, in Embodiment 3, a navigation apparatus will be described which makes it easy to recognize a guide sign for an intersection on the guided route by displaying a simplified map that indicates a travel direction using traffic signals or similar marks.

The configuration of the apparatus of this embodiment is the same as that of the FIG. 1 block diagram, and the corresponding flow diagrams are same as those of FIGS. 2 and 3. Difference of this embodiment from Embodiment 1 is shown in an example of a displayed screen of FIG. 8(b), and will be described below.

Figure 8A:
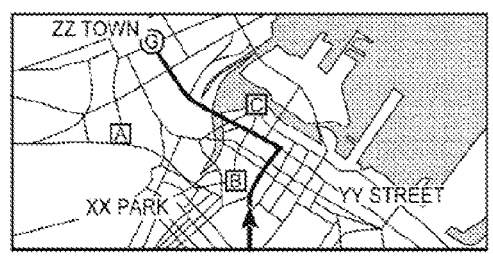
FIG. 8 is a set of drawings showing examples of a screen display according to Embodiment 3 of the present invention.

When the navigation apparatus 1 is activated, the map screen is displayed (FIG. 2, step S100) that contains the own-vehicle mark indicating the location of the moving object on which the apparatus 1 is mounted, as shown in FIG. 8(a). After the menu button has been touched in order to access the menu window, the presence or absence of an established route, the distance between the vehicle and an intersection on the guided route, and a travel speed of the vehicle, are determined to thereby select one of the five different view modes corresponding to steps S160 through S164.

Figure 8B:
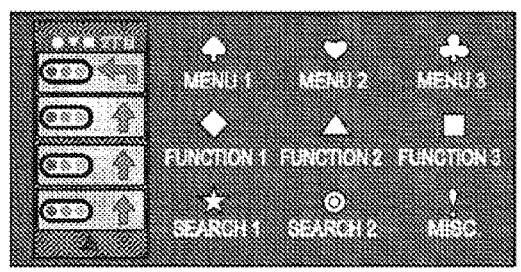

FIG. 8(b) corresponds to step S160. The menu is highlighted, and the simplified map is displayed in which the user can recognize the appearance of a route (step S160). This time menu, which is the same as the menu of FIG. 4(b) in Embodiment 1, is a regular one, with every menu item being selectable. The simplified map at this time provides an indication of traveling straight or making a turn at every traffic signal and every intersection. This figure shows that the vehicle will make a left turn at the fourth traffic signal.

Figure 4A:
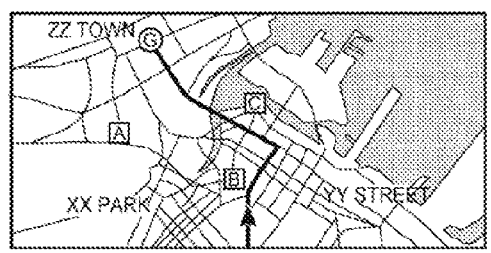
FIG. 4 is a set of drawings showing examples of a screen display according to Embodiment 1 of the present invention.
Figure 4B:
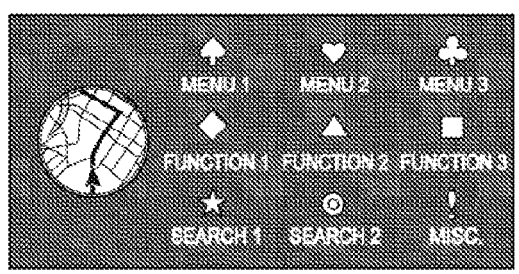
Figure 4C:
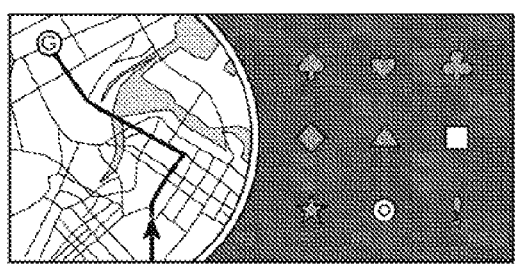
Figure 4D:
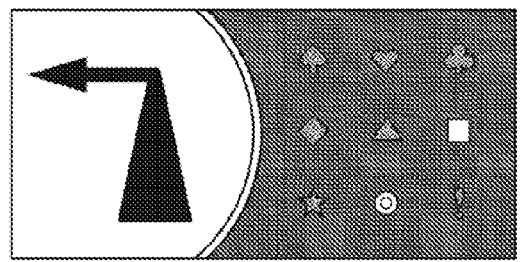
Figure 4E:
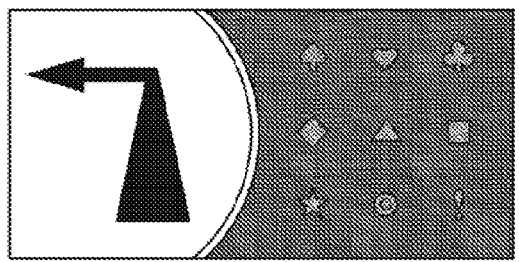
Figure 8C:
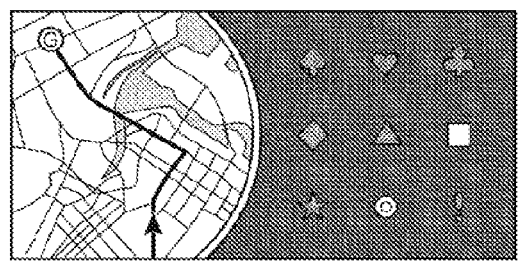
Figure 8D:
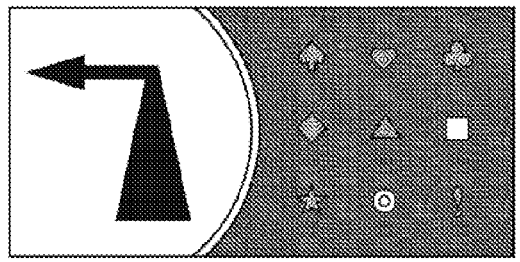
Figure 8E:
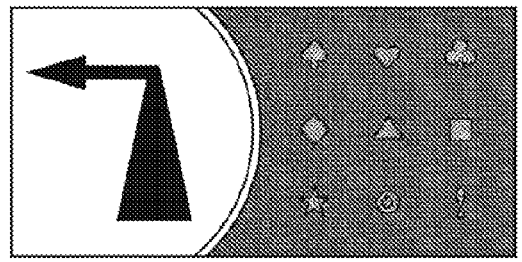

Note that FIG. 8(c) corresponds to step S161 and FIGS. 8(d) and 8(e) correspond to step S162, and these figures are the same as FIGS. 4(c) through 4(e) in Embodiment 1.

In the navigation apparatus thus configured, the vehicle's travel speed, the presence or absence of established route, and the distance from the current vehicle's location to the intersection on the guided route, are checked to vary the view modes of map and menu according to the travel conditions. At this time, the simplified map is displayed on a screen of the apparatus, to provide an indication of traveling straight or making a turn at every traffic signal and every intersection. As a result, a highly convenient navigation apparatus is provided such that even a driver who is poor at viewing a regular map understands the map more easily.

REFERENCE NUMERALS

1 Navigation apparatus
2 Controller
3 Antenna (for use in receiving GPS signals)
4 GPS receiver
6 Vehicle speed sensor
7 Gyro sensor
8 Antenna (for use in receiving road traffic information)
9 Road traffic information receiver
10 Input unit
11 Map matching unit
12 Route search unit
13 Route guide unit
14 Loudspeaker
15 Display controller
16 Display map generator
17 Display menu generator
18 Map DB
19 Menu image DB
20 Image combination unit
21 Display unit

What is claimed is:

1. A navigation apparatus, comprising:
a position identification unit that identifies a travel speed of a moving object and a current location thereof;
an input unit that receives a user input instruction; a map database that stores map data; a route search unit that searches for a route from an origin to a destination; a display controller that determines a view mode of a map screen or a menu window, based on information about a travel condition of the moving object obtained from the route search unit or the position identification unit, when the menu window is displayed according to information entered from the input unit;
a display map generator that generates a map screen according to information about the view mode from the display controller;
a display menu generator that generates a menu window according to information about the view mode from the display controller; and
a display unit that displays the menu window from the display menu generator on the map screen from the display map generator;
wherein the display controller varies a screen area for displaying the map screen or the menu window, based on the information of the travel condition,
wherein the display controller uses, as the information on the travel condition, the travel speed of the moving object,
wherein when the travel speed exceeds a predetermined value, the display controller makes the screen area of displaying the menu window smaller than that where the travel speed is the predetermined value or less, and
wherein when the screen area of the menu window is decreased, characters and letters appearing on a menu window displayed in a larger screen area are removed.

2. The navigation apparatus of claim 1, wherein when the distance between the current location and the intersection on the guided route is within a predetermined range, the display controller makes the screen area of displaying the menu window smaller than that where the distance between the intersection on the guided route and the current location is larger than the predetermined range.

3. The navigation apparatus of claim 1, wherein the menu window is displayed to cause the map screen to be seen through the menu window.

4. A navigation apparatus, comprising:

a position identification unit that identifies a travel speed of a moving object and a current location thereof;

an input unit that receives a user input instruction; a map database that stores map data; a route search unit that searches for a route from an origin to a destination; a display controller that determines a view mode of a map screen or a menu window, based on information about a travel condition of the moving object obtained from the route search unit or the position identification unit, when the menu window is displayed according to information entered from the input unit;

a display map generator that generates a map screen according to information about the view mode from the display controller;

a display menu generator that generates a menu window according to information about the view mode from the display controller; and a display unit that displays the menu window from the display menu generator on the map screen from the display map generator;

wherein the display controller varies a screen area of displaying the menu window, based on the information of the travel condition, wherein the display controller uses, as the information on the travel condition, if the route is established, a distance between the current location of the moving object and an intersection on the guided route, and wherein when the screen area of the menu window is decreased, characters and letters appearing on a menu window displayed in a larger screen area are removed.

5. The navigation apparatus of claim 4, wherein when the distance between the current location and the intersection on the guided route is within a predetermined range, the display controller makes the screen area of displaying the menu window smaller than that where the distance between the intersection on the guided route and the current location is larger than the predetermined range.

6. The navigation apparatus of claim 4, wherein the menu window is displayed to cause the map screen to be seen through the menu window.

* * * * *